United States Patent
Perreault et al.

(10) Patent No.: US 12,413,147 B2
(45) Date of Patent: Sep. 9, 2025

(54) VARIABLE CONTROLLER AND ASSOCIATED CONTROL METHODS

(71) Applicant: Murata Manufacturing Co., Ltd., Kyoto (JP)

(72) Inventors: David J. Perreault, Cambridge, MA (US); John R. Hoversten, Arlington, MA (US); Yevgeniy A. Tkachenko, Belmont, MA (US); Aaron Cook, Deerfield, NH (US); Kapil Kesarwani, Bedford, NH (US)

(73) Assignee: Murata Manufacturing Co. Ltd., Kyoto (JP)

( * ) Notice: Subject to any disclaimer, the term of this patent is extended or adjusted under 35 U.S.C. 154(b) by 271 days.

(21) Appl. No.: 17/821,257

(22) Filed: Aug. 22, 2022

(65) Prior Publication Data
US 2023/0056740 A1     Feb. 23, 2023

Related U.S. Application Data

(60) Provisional application No. 63/235,927, filed on Aug. 23, 2021.

(51) Int. Cl.
*H02M 1/00*       (2007.01)
*H02M 3/158*     (2006.01)

(52) U.S. Cl.
CPC ......... *H02M 3/158* (2013.01); *H02M 1/0012* (2021.05); *H02M 1/0025* (2021.05)

(58) Field of Classification Search
CPC .... H02M 3/156; H02M 3/158; H02M 3/1582; H02M 3/335; H02M 3/33507;
(Continued)

(56) References Cited

U.S. PATENT DOCUMENTS

| | | |
|---|---|---|
| 7,746,041 B2 | 6/2010 | Xu et al. |
| 7,777,459 B2 | 8/2010 | Williams |

(Continued)

FOREIGN PATENT DOCUMENTS

KR     20160018145 A   *   2/2016

OTHER PUBLICATIONS

Cao, et al.; "A Family of Zero Current Switching Switched-Capacitor DC-DC Converters"; 2010 Twenty-Fifth Annual IEEE Applied Power Electronics Conference and Exposition (APEC); Feb. 21-25, 2010; 8 Pages.

(Continued)

*Primary Examiner* — Thienvu V Tran
*Assistant Examiner* — Shahzeb K Ahmad
(74) *Attorney, Agent, or Firm* — Daly, Crowley, Mofford & Durkee, LLP

(57) ABSTRACT

A circuit comprising a first capacitor configured to be charged to a voltage representing state information of a compensator, a second capacitor, a buffer circuit configured to charge the second capacitor to a voltage substantially equal to that of the first capacitor and a switching network configured to transition between a first state and a second state. When the switching network is in the first state, the second capacitor is charged to the voltage across the first capacitor. When the switching network is in the second state, the buffer circuit is disconnected from the second capacitor and the first capacitor and the second capacitor are connected in parallel.

22 Claims, 8 Drawing Sheets

(58) Field of Classification Search
CPC ......... H02M 3/33569; H02M 3/33571; H02M 1/0003; H02M 1/0012; H02M 1/0016; H02M 1/0025; H02M 3/07; H02M 3/075
See application file for complete search history.

(56) References Cited

U.S. PATENT DOCUMENTS

| | | | |
|---|---|---|---|
| 7,782,027 B2 | 8/2010 | Williams | |
| 7,786,712 B2 | 8/2010 | Williams | |
| 7,812,579 B2 | 10/2010 | Williams | |
| 7,977,927 B2 | 7/2011 | Williams | |
| 8,212,541 B2 | 7/2012 | Perreault et al. | |
| 8,824,978 B2 | 9/2014 | Briffa et al. | |
| 8,829,993 B2 | 9/2014 | Briffa et al. | |
| 8,830,709 B2 | 9/2014 | Perreault et al. | |
| 8,830,710 B2 | 9/2014 | Perreault et al. | |
| 8,860,396 B2 | 10/2014 | Giuliano | |
| 8,957,727 B2 | 2/2015 | Dawson et al. | |
| 9,020,453 B2 | 4/2015 | Briffa et al. | |
| 9,160,287 B2 | 10/2015 | Briffa et al. | |
| 9,166,536 B2 | 10/2015 | Briffa et al. | |
| 9,172,336 B2 | 10/2015 | Briffa et al. | |
| 9,209,758 B2 | 12/2015 | Briffa et al. | |
| 9,490,752 B2 | 11/2016 | Briffa et al. | |
| 9,531,291 B2 | 12/2016 | Perreault | |
| 9,537,456 B2 | 1/2017 | Briffa et al. | |
| 9,634,577 B2 | 4/2017 | Perreault | |
| 9,755,672 B2 | 9/2017 | Perreault et al. | |
| 9,768,731 B2 | 9/2017 | Perreault et al. | |
| 9,768,732 B2 | 9/2017 | Briffa et al. | |
| 9,917,517 B1 | 3/2018 | Jiang et al. | |
| 9,979,421 B2 | 5/2018 | Astrom et al. | |
| 9,991,913 B1 | 6/2018 | Dinur et al. | |
| 10,164,577 B2 | 12/2018 | Briffa et al. | |
| 10,193,441 B2 | 1/2019 | Giuliano | |
| 10,218,268 B1 * | 2/2019 | Kamble | H02M 3/073 |
| 10,291,184 B1 | 5/2019 | Sutskover et al. | |
| 10,389,235 B2 | 8/2019 | Giuliano | |
| 10,658,981 B2 | 5/2020 | Briffa et al. | |
| 10,749,476 B2 | 8/2020 | Sutskover et al. | |
| 10,862,428 B2 | 12/2020 | Henzler et al. | |
| 10,992,265 B2 | 4/2021 | Hoversten et al. | |
| 11,031,864 B2 | 6/2021 | Low et al. | |
| 11,043,918 B2 | 6/2021 | Tanaka et al. | |
| 11,191,028 B2 | 11/2021 | Hoversten et al. | |
| 11,245,367 B2 | 2/2022 | Garrett et al. | |
| 11,558,014 B2 | 1/2023 | Tanaka et al. | |
| 11,637,531 B1 | 4/2023 | Perreault et al. | |
| 11,664,727 B2 | 5/2023 | Giuliano et al. | |
| 11,736,010 B2 | 8/2023 | Giuliano et al. | |
| 11,757,410 B2 | 9/2023 | Hoversten et al. | |
| 11,757,411 B2 | 9/2023 | Tanaka et al. | |
| 11,764,669 B2 | 9/2023 | Chen et al. | |
| 2006/0176098 A1 * | 8/2006 | Chen | H02M 3/156 327/341 |
| 2009/0212830 A1 * | 8/2009 | Zamprogno | H03F 3/45977 327/108 |
| 2011/0012765 A1 * | 1/2011 | Hsieh | H03K 5/249 341/143 |
| 2013/0113550 A1 * | 5/2013 | Bawa | H03H 19/004 327/554 |
| 2018/0375434 A1 | 12/2018 | Biziitu et al. | |
| 2020/0099290 A1 * | 3/2020 | Szczeszynski | H02M 3/07 |
| 2020/0228016 A1 | 7/2020 | Wu et al. | |
| 2021/0288614 A1 | 9/2021 | Hoversten et al. | |
| 2021/0385752 A1 | 12/2021 | Hoversten et al. | |
| 2022/0103066 A1 | 3/2022 | Chen et al. | |
| 2022/0131463 A1 | 4/2022 | Giuliano et al. | |
| 2022/0149725 A1 | 5/2022 | Garrett et al. | |
| 2023/0054485 A1 | 2/2023 | Hoversten et al. | |
| 2023/0057037 A1 | 2/2023 | Hoversten et al. | |

OTHER PUBLICATIONS

Cao, et al.; "Multiphase Multilevel Modulator DC-DC Converter for High-Current High-Gain TEG Application"; IEEE Transactions on Industry Application; vol. 47; No. 3; May/Jun. 2011; 9 Pages.

Chen, et al; "A High Efficiency High Power Step-Up Resonant Switched-Capacitor"; 2012 IEEE Energy Conversion Congress and Exposition (ECCE); Sep. 15-20, 2012; 5 Pages.

Shoyama, et al.; "Resonant Switched Capacitor Converter with High Efficiency"; 2004 35$^{th}$ Annual IEEE Power Electronics Specialists Conference; 2004; 7 Pages.

Sun, et al.; "High Power Density, High Efficiency System Two-Stage Power Architecture for Laptop Computers"; 2006 37th IEEE Power Electronics Specialists Conference; Jun. 18-22, 2006; 7 Pages.

Unknown; "Fundamentals of Power Electronics"; Chapter 19: Resonant Conversion; Sep. 19, 2019; 87 Pages.

Yeung, et al.; "Multiple and Fractional Voltage Conversion Ratios for Switched-capacitor Resonant Converters"; 2001 IEEE 32nd Annual Power Electronics Specialists Conference (IEEE Cat. No. 01CH37230); Jun. 17-21, 2001; 6 Pages.

PCT International Search Report and Written Opinion dated Jan. 10, 2023 for International Application No. PCT/US2022/041011; 12 pages.

* cited by examiner

VARIABLE CONTROLLER AND ASSOCIATED CONTROL METHODS

RELATED APPLICATION

This application claims the benefit of U.S. Provisional Application No. 63/235,927, filed Aug. 23, 2021, and entitled "VARIABLE CONTROLLER AND ASSOCIATED CONTROL METHODS," which is incorporated herein by reference in its entirety.

FIELD

This disclosure relates generally to a variable controller and associated control methods, and more particularly to a variable controller and associated control methods for a compensator.

BACKGROUND

As is known in the art, adjusting a control system to improve its performance might lead to unexpected behavior. For example, increasing a gain value of a control system may result in poor stability (or even instability) of the system being controlled. To make the control system behave as desired, it may be necessary to include a compensator network (also sometimes referred to as a "compensator system," a "compensator circuit," or more simply a "compensator") which compensates for deficient performance of an original control system. A compensator may thus be considered as component of a control system used to regulate other control system components. A compensator may perform such regulation, for example, by conditioning an input signal or an output signal of the system (e.g., conditioning an input or output signal to a control system).

As is also known, a power electronic converter is a circuit which converts one form or level of electrical power to another form or level (e.g., a dc-to-dc converter). Many power electronic converters must operate over both a range of operating characteristics as well as in multiple, different operating modes. For example, many power electronic converters must operate over a range of input and/or output signals, voltage conversion ratios, ranging load characteristics, a range of power levels and the like as well as in multiple, different operating modes (e.g., buck, buck+buck-boost, buck/boost, boost, peak current mode, valley current mode, low-power modes such as pulse frequency modulation, etc.).

The ability of a power converter to function over a range of operating characteristics and in multiple, different operating modes is often accomplished with a fixed controller or fixed compensator (i.e., a controller having a predefined architecture and controller structure such as a single-loop SISO control architecture where the controller is a fixed-order transfer function, a PID controller, or a PID controller plus a filter). However, because the dynamics of devices such as power converters vary considerably with operating point and operational mode, the achievable dynamic performance within a mode and/or over a range of power converter operating characteristics can be quite limited by use of a single fixed controller or compensator.

SUMMARY

In accordance with the concepts described herein, it has been recognized that it would be valuable to provide a compensator that yields different dynamics/control performance for one or more of: (a) different operating modes (e.g., buck vs. boost vs. buck+buck-boost, or Pulse-Width Modulation vs. Pulse Frequency Modulation, etc.); and (b) different operating ranges or points (e.g., different input voltage, output voltage, reference voltage, conversion ratio or load regimes) such as different operating modes and/or different operating ranges or points of a power electronics circuit.

In accordance with the concepts described herein, it has been recognized that it would be further desirable to be able to change compensator characteristics and/or dynamics such as pole and/or zero locations (i.e., the frequencies for which the value of the denominator and numerator of a transfer function becomes zero, respectively and which determine the stability of the system represented by the transfer function) without introducing transients or "bumps" in operation at the transition point when compensator characteristics are changed.

Described is such a time/mode/operating point variable controller that is particularly well suited to integrated high-performance power electronic converter applications. It will also be appreciated that many other applications need operate across wide ranges and multiple modes and can likewise benefit from the techniques described herein.

In an aspect, a circuit includes a first capacitor configured to be charged to a voltage representing state information of a compensator, a second capacitor, a buffer circuit configured to charge the second capacitor to a voltage substantially equal to that of the first capacitor, and a switching network configured to transition between a first state and a second state. When the switching network is in the first state, the second capacitor is charged to the voltage across the first capacitor. When the switching network is in the second state, the buffer circuit is disconnected from the second capacitor and the first capacitor and the second capacitor are connected in parallel.

Implementations can include one or more of the following features.

In some implementations, when the switching network is in the first state, dynamics of the compensator are determined at least in part by the first capacitor, and when the switching network is in the second state, the dynamics of the compensator are determined at least in part by a total capacitance provided by the first capacitor and the second capacitor connected in parallel.

In some implementations, the capacitance provided based on the state of the switching network affects a pole location of the compensator.

In some implementations, the capacitance provided based on the state of the switching network affects a zero location of the compensator.

In some implementations, transitioning the switching network between the first and second states does not cause a transient impact on the voltage across the first capacitor.

In some implementations, transitioning the switching network between the first and second states does not cause a transient impact on a voltage provided at an output of the compensator.

In some implementations, transitioning the switching network between the first and second states does not disturb the voltage provided at the output of the compensator.

In some implementations, the switching network comprises a complementary switch pair configured to switch between the first state and the second state.

In some implementations, the circuit includes a third capacitor. The buffer circuit is configured to charge the third capacitor to a voltage substantially equal to the voltage across the first capacitor. The switching network is configured to transition between at least two additional states to cause the third capacitor to switch between being charged to the voltage across the first capacitor, and being disconnected from the buffer circuit and connected in parallel with one or both of the first capacitor and the second capacitor.

In some implementations, the circuit includes a resistor connected to one or both of the first capacitor and the second capacitor.

In some implementations, the circuit is part of a power converter.

In some implementations, when the complementary switch pair is in the first state, a first switch is closed and a second switch is open. When the complementary switch pair is in the second state, the first switch is open and the second switch is closed.

In some implementations, the switching network is controlled by a control signal.

In some implementations, the control signal automatically causes switches of the switching network to switch based on one or both of an operating mode and an operating point of the circuit.

In some implementations, the operating mode includes buck, boost, or buck+buck-boost mode.

In some implementations, the operating point includes one or more of an input voltage, an output voltage, a conversion ratio, and a load current of the circuit.

In some implementations, the buffer circuit includes an op-amp.

In some implementations, the op-amp is configured to charge the second capacitor to a voltage that is related to an output voltage and a reference voltage of the compensator.

In an aspect, a compensator circuit is configured to provide an output voltage. The compensator circuit includes a plurality of resistors and a switching network coupled to at least one of the plurality of resistors. The switching network is configured to transition between states to cause selected ones of the plurality of resistors to be connected in parallel with each other. The compensator circuit also includes a capacitor coupled to the selected ones of the plurality of resistors connected in parallel with each other.

Implementations can include one or more of the following features.

In some implementations, dynamics of the compensator circuit are determined at least in part by a total resistance provided by the selected ones of the plurality of resistors connected in parallel with each other.

In some implementations, the total resistance determined by the state of the switching network affects a zero location of the compensator circuit.

In some implementations, the compensator circuit is part of a power converter.

BRIEF DESCRIPTION OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Figure 1:
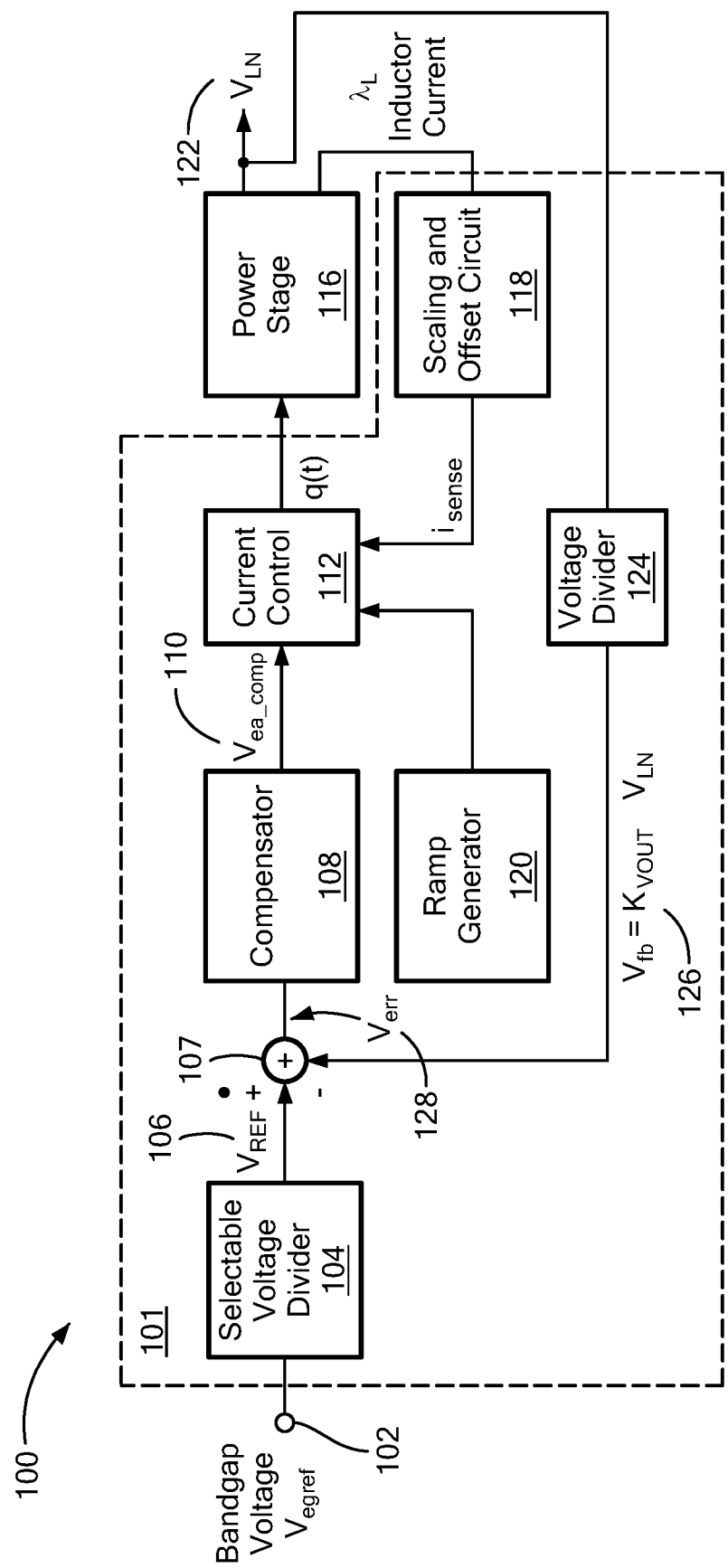
FIG. 1 is a block diagram of an exemplary control system for a power converter.

Referring now to FIG. 1, an exemplary system 100 includes a control system 101 (sometimes referred to herein as a controller) for a power stage 116 (e.g., a dc-dc power converter). The system 100 may be a power electronics system. The control system 101 includes a selectable voltage divider 104 having an input coupled to an input 102 of control system 101. A bandgap reference voltage $V_{egref}$ is provided to control system input 102 and coupled to an input of the selectable voltage divider 104. Selectable voltage divider 104 receives the bandgap reference voltage $V_{egref}$ and provides a target reference voltage $V_{REF}$ at an output 106 thereof. As will become apparent from the description provided herein, target reference voltage $V_{REF}$ for an output voltage $V_{LN}$ 122 is set by bandgap voltage reference $V_{egref}$. In embodiments, bandgap voltage reference $V_{egref}$ may have a value of about 1.25 V, which may be divided down by a programmable amount via selectable voltage divider 104.

An output of selectable voltage divider 104 is coupled to a first input of a difference circuit 107 and a second input of difference circuit 107 is coupled to receive a feedback voltage $V_{fb}$ 126. An output of difference circuit 107 represents an error voltage $V_{err}$ 128 between the output voltage $V_{LN}$ 122 and a desired value of the output voltage. The output of difference circuit 107 is coupled to an input of a compensator 108 (sometimes referred to as an error amplifier), and an output of compensator 108 is coupled to a current control circuit 112. An output of current control circuit 112 is coupled to the power stage 116 and power stage 116 provides an output voltage $V_{LN}$ at an output 122 thereof. Power stage 116 may be provided, for example, as a power converter. It should, of course, be appreciated that although the broad concepts described herein are described in the context of a power electronics system, control systems (such as control system 101) operating in accordance with the concepts described herein may be used in conjunction with other types of systems (i.e., systems other than power electronics systems). Such other systems can include servo-mechanisms (e.g., position or velocity control systems), tracking or targeting systems, and actuation systems, among many others.

In some implementations, the compensator 108 may be referred to as an error amplifier herein. In some implementations, the components of the control system 101 may be referred to cumulatively as a compensator, and an error amplifier can be a part of the overall compensator.

At least a portion of output voltage $V_{LN}$ 122 is coupled to an input of a voltage divider circuit 124 and a feedback voltage $V_{fb}$ 126 is provided at an output of voltage divider circuit 124. Thus, feedback voltage $V_{fb}$ 126 (which may be a divided down version of the output voltage $V_{LN}$ 122 provided by voltage divider 124) is provided to a second input of difference circuit 107 and compared with reference voltage $V_{REF}$ to provide an error voltage $V_{err}$ 128.

Error voltage $V_{err}$ 128 is coupled to an input of compensator 108. Compensator 108 provides an output signal (here, an output voltage $V_{ea\_comp}$) at an output 110 thereof. Compensator output signal is coupled through current control circuit 112 to an input of power stage 116 and is used to control power stage 116. Such control system output signals may correspond, for example, to signals for commanding a duty ratio in a duty ratio-controlled converter (also known as voltage-mode control), commanding a peak commanded current for the inductor in a peak current-mode-controlled converter, or another control variable (e.g., duty ratio, valley current, average current, etc.).

In embodiments, an associated modulator (duty cycle generator, PWM unit, current-mode control block, etc.) may use such control signals (e.g., commands) to generate switching signals for the power stage 116, as is known in the art.

An output signal from power stage 116 is coupled through a scaling and offset circuit 118 to an input of current control circuit 112 as a current signal $i_{sense}$. A ramp generator circuit 120 also provides a signal to current control circuit 112. It should be appreciated that circuits 118, 120 are auxiliary to the controller and thus in some embodiments may not be included or may not be considered part of control system 101.

The current control circuit 112 provides a way to regulate inductor current in a power converter. The current control circuit 112 takes as inputs a desired reference for said inductor current $V_{ea\_comp}$, provided at the output 110 of the compensator 108, and a measurement or estimate of an inductor or other current ($i_{sense}$) in the power converter power stage 116, generates as an output a switching signal q(t) for said power converter power stage 116. The current control circuit 112 can be useful for providing multi-loop control or full-state feedback control of a power converter for improved dynamic performance. Scaling and offset circuit 118 allows a measured or estimated value of the inductor or other current ($\lambda_L$) in power stage 116 to be converted to a form and range that is useful for the current control circuit 112 (i.e., $i_{sense}$). Ramp generator 120 can provide a timing (clocking) reference and ramp to the current control circuit 112 allow the current control circuit 112 to implement slope compensation.

Characteristics of the compensator 108 can be selected based upon the dynamics of the "plant." In some implementations, the plant comprises at least the power stage 116. The characteristics can be selected to result in stable control of the output of the system 100, preferably with fast transient response and good stability margin. The plant dynamics (i.e., the open-loop dynamics of power stage 116), and hence the overall system dynamics (i.e., the closed loop system dynamics of the plant—i.e., power stage 116—modified by the compensator 108), can depend upon converter operating mode (buck, boost, PFM, PWM, etc.) as well as operating point (output voltage, load, conversion ratio, etc.) making the design of the compensator 108 challenging.

The compensator 108 of FIG. 1 may take the form of or may include one or more features of any one or more of the compensators described herein with respect to FIGS. 3-7.

Figure 2:
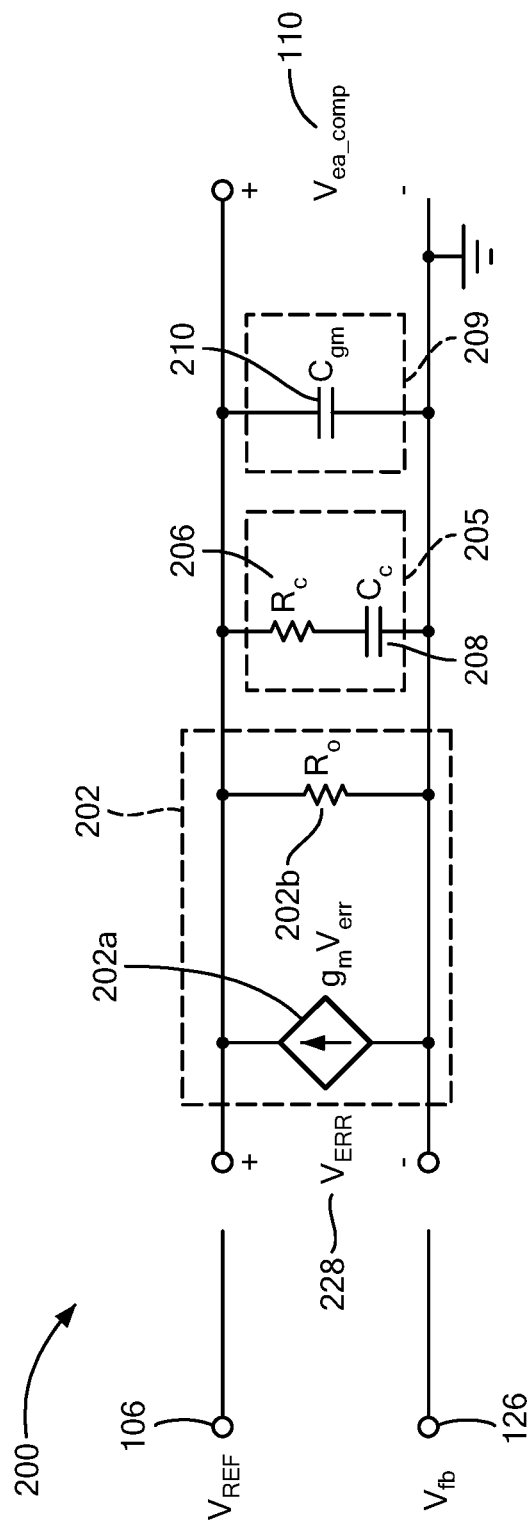
FIG. 2 is a schematic diagram of an exemplary prior art compensator.

Referring now to FIG. 2, FIG. 2 shows a circuit diagram of a prior art compensator 200. Such a circuit might be implemented as an integrated circuit (IC) such as part of a power converter IC or as a controller IC.

Compensator 200 comprise an amplifier 202 which is here represented as a model having a gain element 202a and an output resistance $R_o$ 202b. In embodiments, amplifier 202 may, for example, be provided as a transconductance amplifier (e.g., an operational transconductance amplifier) or a voltage amplifier. A plurality of resistive and/or capacitive signal paths (or "legs") 205, 209 are coupled at an output of amplifier 202, for example, in the form of an output voltage $V_{ea\_comp}$. In this example, signal path 205 comprises series coupled resistor $R_c$ 206 and a capacitor $C_c$ 208 and signal path 209 comprises a capacitor $C_{gm}$ 210. In embodiments, compensator 200 may be provided as an integrated circuit.

In some implementations, amplifier 202 might be realized as an operational amplifier. In some implementations, the value of gain ("transconductance") $g_m$ might be made programmable over a range in order to allow some degree of programmability/dynamic tuning of the system dynamics.

An error voltage $V_{err}$ 228 is provided to an input of compensator 200 and coupled to amplifier 202.

If one assumed that amplifier output resistance $R_o$ 202b were infinite, a small-signal compensator transfer function $G_C(s)$ from $V_{err}=V_{REF}-V_{fb}$ to the compensator output 110 $V_{ea\_comp}$ could be expressed as:

$$G_C(s) = \frac{v_{ea\_comp}}{v_{err}} = \frac{g_m}{s(C_{gm}+C_c)} \cdot \frac{1+sR_cC_c}{1+sR_c\frac{C_{gm}C_c}{C_{gm}+C_c}}. \quad \text{(Eq. 1)}$$

In practical circuits, however, the output resistance $R_o$ 202b is finite. However, if the amplifier output resistance is sufficiently large (e.g., such that the error between (Eq. 1) and (Eq. 2) is unimportant), this expression is useful for approximately locating the compensator zero and second pole. Including output resistor $R_o$ 202b, the following compensator transfer function results:

$$G_C(s) = \frac{v_{ea\_comp}}{v_{err}} = g_m R_o \cdot \frac{1+sR_cC_c}{s^2R_oC_{gm}R_cC_c + s(R_oC_{gm}+R_oC_c+R_cC_c)+1}. \quad \text{(Eq. 2)}$$

In this exemplary compensator 200, the compensator DC gain is set by the product of amplifier gain $g_m$ and output resistance (i.e., the compensator DC gain is set by the product of $g_mR_o$). The value of resistor $R_c$ 206 and capacitor $C_c$ 208 set the zero of the transfer function, while the pole locations are set by multiple component parameters as shown in Eq. 2. One can adjust compensator dynamics (i.e., the manner in which the compensator responds—in an electrical circuit sense—to inputs provided thereto) by introducing programmability of one or more of these elements (e.g., by using a switchable resistor bank to dynamically adjust (or change) the resistance value of resistor $R_c$ 206 to modify the compensator zero, by dynamically programming the gain value $g_m$ to modify the compensator gain, etc.).

Such dynamic adjustments/changes/programming can be based on system operating condition (e.g., mode, operating voltages or power levels, etc.). It can be desirable to have different values of compensator components to modify how the circuit will react dynamically under different system operating conditions, and such dynamic adjustability can allow such.

The capacitor $C_{gm}$ 210 can be a combination of device output capacitance and physical capacitance used in setting characteristics of the transfer function $G_C(s)$ as per (Eq. 2). The resistor $R_c$ 206 and the capacitor $C_c$ 208 are circuit elements used to set the transfer function as per (Eq. 2). Using the components as illustrated allows the ability to set different characteristics of the transfer function $G_C(s)$.

Figure 3:
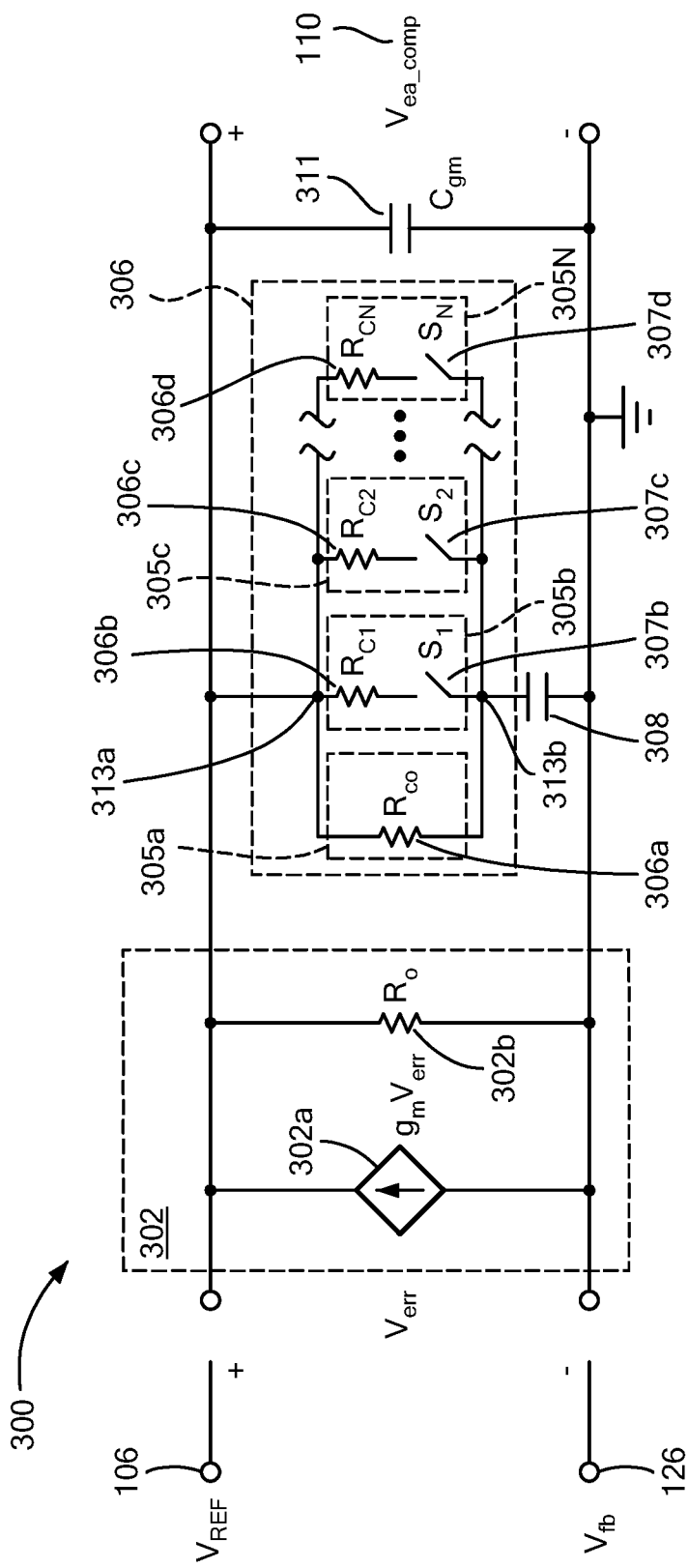
FIG. 3 is a schematic diagram of an exemplary compensator provided in accordance with the concepts described herein in which a resistance value of a resistor $R_c$ can be dynamically changed.

Referring now to FIG. 3, in this embodiment, an exemplary compensator 300 includes a programmable resistive element 306 (i.e., a resistive element capable of being adjusted or changed) comprising a plurality (or bank) of parallel coupled resistive legs 305a-405N. At least one of the resistive legs (illustrated as a single resistive leg 305a in FIG. 3) comprises a resistor (here illustrated as resistor 306a) having a resistance value $R_{c0}$. The compensator 300 also includes a switching network that can include a plurality of switch elements, or switches $S_1$-$S_N$ 307b-307N.

Programmable resistive element 306 further comprises at least one resistive leg comprising both a resistive element and a switch element. In the example embodiment of FIG. 3, resistive legs 305b-305N each comprise both a resistive element and a switching element. Taking resistive leg 306b as illustrative of resistive legs 305c-305N, resistive leg 305b comprises a resistor 306b having a resistance value $R_{c1}$ coupled to a switch $S_1$ 307b. Similarly, resistive legs 305c-305N comprise respective ones of resistors 306c-306N having respective resistance values $R_{c2}$-$R_{cN}$ coupled to respective ones of switches $S_2$-$S_N$ 307c-307N.

When switches $S_1, \ldots, S_N$ 307b-N are closed or on (i.e., the switch is biased or otherwise set into a state or position such that a low impedance signal path (and ideally a short circuit impedance signal path) exists between a pair of terminals thereof) a conductive path having a resistance less than an open circuit resistance exists between nodes 313a, 313b. For example, with switch $S_1$ closed or on and all other switches $S_2 \ldots S_N$ open or off, a signal path comprising resistor 306b and switch 307b having a resistance substantially equal to $R_{c1}$ exists between nodes 313a, 313b. Thus, by selecting which of switches $S_1, \ldots, S_N$ 307b-N are turned on, resistive element 306 is adjustable (or programmable or selectable) in steps between a first (or minimum) resistance value and a second (or maximum) resistance value.

In the example embodiment of FIG. 3, the maximum resistance value is set by the resistance value $R_{c0}$ of resistor 306a and the minimum resistance value is set by the equivalent resistance provided by resistors 306a-306N (i.e., the equivalent resistance provided by the parallel combination of resistors $R_{c0} \| R_{c1} \| \ldots \| R_{cN}$). Thus, by selecting which of switches $S_1, \ldots, S_N$ 307b-N are turned on (i.e., biased or otherwise set into their ON states) resistive element 306 is provided having one of a plurality of different resistance characteristics.

The plurality of switches $S_1$-$S_N$ 307b-307N can thus operate (or be controlled) to cause one or more of the plurality of second resistors $R_{c1}$-$R_{cn}$ 306b-306N to either be electrically disconnected from the first resistor $R_{c0}$ 306a or coupled in parallel with the first resistor $R_{c0}$ 306a. A total resistance provided by the first resistor $R_{c0}$ 306a and coupled ones of the plurality of second resistors $R_{c1}$-$R_{cn}$ 306b-306N can cause one or more dynamics of the compensator 300 to be adjusted, such as one or more zero locations of the compensator 300, as described herein.

As noted above, resistive element 306 has a first terminal coupled to a node 313a at which a compensator output 110 (e.g., output voltage $V_{ea\_comp}$) is provided. For example, the voltage at node 313a with reference to ground may correspond to the compensator output 110 (e.g., the output voltage $V_{ea\_comp}$). A second terminal of resistor 306a is coupled to a node 313b. A first terminal of a capacitor 308 having a capacitance of $C_c$ is coupled to a node 313b and a second terminal of capacitor 308 coupled to a reference potential, here ground.

It should, of course, be appreciated that while FIG. 3 illustrates one example embodiment of a dynamically programmable element (i.e., a dynamically programmable resistance element 306) disposed to influence (e.g., change or shape) the dynamics of a compensator, other embodiments which implement the concept of dynamic programmability are also possible. For example, an implementation comprising a programmable resistance element may comprise a first signal path having a set of individual resistors coupled in series, a second signal path coupled in parallel to the first signal path and or more control switches (e.g., one or more of switches 307b-307N) disposed at various points between the first and second signal paths and operable to selectively include or bypass one, some or all of the resistors in the first signal such that only selected ones of the resistors in the first signal path contribute to the overall resistance between first and second terminals of the programmable resistance element and thus can be used to adjust one or more dynamics of the compensator. For example, the one or more dynamics that can be adjusted can include one or more zero locations of the compensator.

In another example embodiment, the plurality of second resistors $R_{c1-N}$ 306b-N and the plurality of switches $S_{1-N}$ 307b-N can be arranged such that the switches 307b-N operate to couple selected ones of resistors $R_{c1-N}$ 306b-N in series with the first resistor $R_{c0}$ 306a. A total resistance provided by the first resistor $R_{c0}$ 306a and the plurality of second resistors $R_{c1-N}$ 306b-N can cause one or more dynamics of the compensator 300 to be adjusted. For example, the one or more dynamics that can be adjusted can include one or more zero locations.

The above-described programmability can be such that a dynamic (transient) impact on the system does not result during operation. In the embodiment of FIG. 3, compensator 300 comprises a programmable resistance element and the compensator 300 state is held by the voltage on capacitors $C_{gm}$ 311 and $C_c$ 308, with capacitor $C_{gm}$ 311 being particularly central to determining the compensator pole locations and resulting system dynamics. Stated differently, in the system of FIG. 3, the compensator output 110 $V_{ea\_comp}$ is substantially, directly determined by the voltage on capacitor $C_{gm}$ 311. In this way, the voltage that the capacitor $C_{gm}$ 311 is charged to can represent state information (e.g., the compensator dynamics described herein such as gain, pole locations, zero locations, etc.) for the compensator 300. Any operation (e.g., compensator programming change) that disturbs this voltage causes a variation (e.g., a "bump") in the compensator output 110 $V_{ea\_comp}$. Such variations in compensator output signals (e.g., output voltage $V_{ea\_comp}$) are undesirable for control.

Thus, in accordance with a further aspect of the concepts described herein, it has been recognized that it would be desirable to provide a system that allows dynamic reprogrammability/variability of compensator capacitors (such as capacitor $C_{gm}$ 311 ) to enable rapid modification of control (and associated dynamics) for different modes and operating ranges without introducing control bumps in the compensator output voltage $V_{ea\_comp}$.

In accordance with a still further aspect of the concepts described herein, it has also been recognized that the above goal may be achieved by introducing one or more additional compensation capacitors that can be switched in and out (i.e., electrically coupled to and electrically decoupled from) a compensator network thus making the compensation capacitor dynamically programmable.

As will be described in detail below, to prevent undesirable transients when a compensation capacitor is switched into the compensator, a buffer may be utilized that keeps compensation capacitors that are not presently active in the compensator pre-charged at the value of the compensator capacitor voltage in use (i.e., tracking the active compensator capacitor's voltage value.) An exemplary circuit for realizing a programmable value for a capacitor (e.g., such as capacitor 311 in FIG. 3 having capacitance value $C_{gm}$) is shown in FIG. 4.

Figure 4:
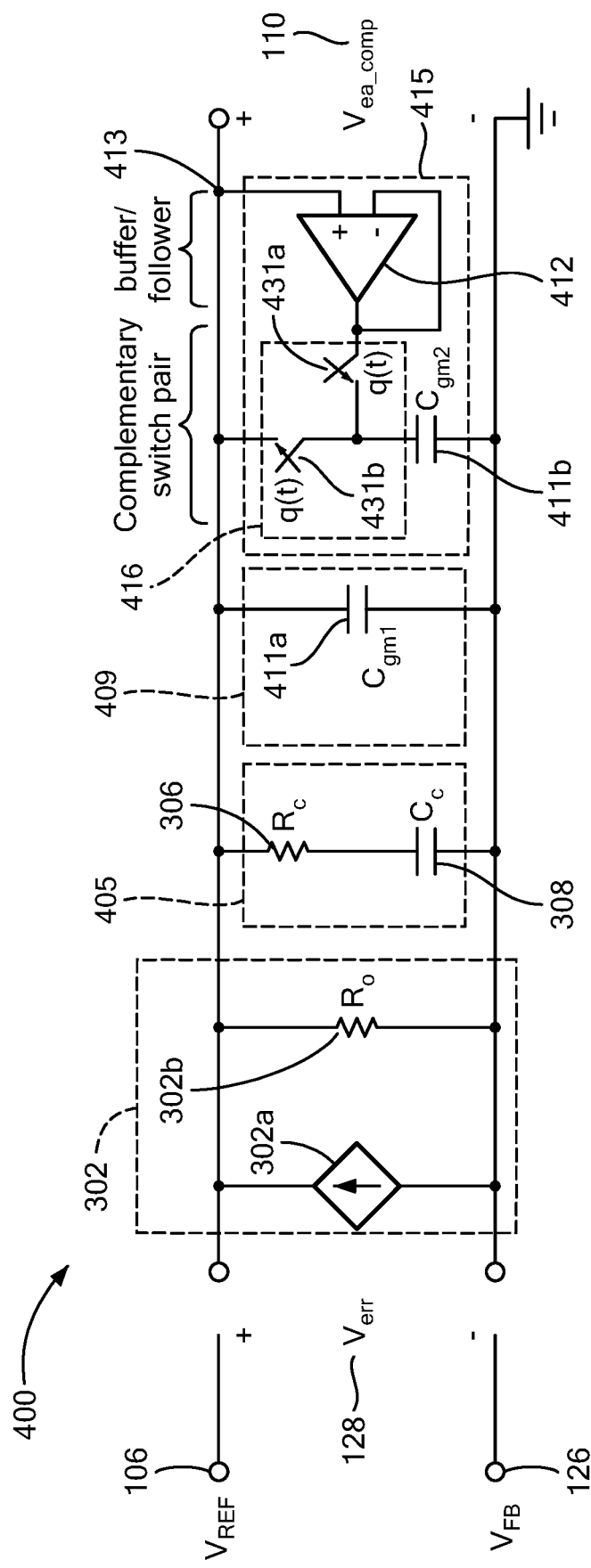
FIG. 4 is a schematic diagram of an exemplary compensator having a capacitor $C_{gm}$ which can be dynamically changed between a first capacitance value and a second capacitance value.

Referring now to FIG. 4, shown is an exemplary compensator 400 having an effective capacitance which can be dynamically programmed (i.e., changed or otherwise adjusted during operation) between at least a first capacitance value and a second, different capacitance value. In the example of FIG. 4, the capacitance of compensator 400 can be dynamically programmed between a first capacitance value corresponding to $C_{gm1}$ and a second capacitance value corresponding $C_{gm1}+C_{gm2}$. Significantly, the effective capacitance value of compensator 400 (generally referred to as $C_{gm}$) can be programmed without disturbing the compensator output signal 110 (e.g., without causing a transient impact on the compensator output voltage $V_{ea\_comp}$).

In this example embodiment, compensator 400 includes a first capacitor 411a and a capacitive buffer circuit 415. In this example, the capacitive buffer circuit 415 includes a second capacitor 411b. First capacitor 411a is provided having a capacitance corresponding to $C_{gm1}$ and the second capacitor 411b is provided having a capacitance corresponding to $C_{gm2}$. Capacitive buffer circuit 415 also comprises a switching network 416 coupled to the second capacitor 411b. Switching network 416 has two states: a first state for charging the second capacitor 411b to a desired value, and another state for placing capacitor 411b in parallel with capacitor 411a. It should be appreciated that the functionality of switching network 416 may be achieved with a variety of different circuit implementations. For example, as illustrated in the example embodiment of FIG. 4, such a switching network 416 may be implemented via a single complementary switch pair such as with switches 431a, 431b. In FIG. 4, switches 431a, 431b are configured to switch in a complementary fashion (i.e., when switch 431a is biased into its ON state, switch 431b is biased into its OFF state and vice-versa) and thus switches 431a, 431b are sometimes referred to as a "complementary switch pair" or as "complementary switches." After reading the disclosure provided herein, those of ordinary skill in the art will appreciate how best to implement the functionality provided by a switching network for use in a particular application.

Complementary switch pair 431a, 431b are controlled by a switching signal q(t) (also sometimes referred to as a "switch control signal," a "programming signal" or more simply a "control signal"). The complementary switch pair 431a, 431b are coupled to a first capacitor 411a having a capacitance of $C_{gm1}$.

In one example embodiment, buffer circuit 415 is configured to receive a switch control signal q(t) such that when switch control signal q(t) has a first value (e.g., q(t) is low such as a logical 0), switch 431a is closed (or placed in its ON state) and switch 431b is open (or placed in its OFF state).

In this circuit configuration (i.e., control signal q(t) has the first value thereby placing switch 431a in closed or ON state and switch 431b in an open or OFF state), capacitor 411a is coupled to a buffer 412 that ensures its voltage tracks that of the output voltage 110, and includes switch circuitry which effectively electrically disconnects (or electrically removes) capacitor 411a from the compensator circuit 400 (e.g., such that the capacitor 411a having capacitance value $C_{gm1}$ does not influence the dynamics of the compensator 400). In embodiments, the buffer 412 may comprise an op-amp follower circuit or more simply "a follower" that maintains the voltage on the first capacitor 411a to be substantially the same as the voltage on a second capacitor 411b, which is also substantially the compensator output voltage $V_{ea\_comp}$ 110.

A first input of buffer 412 (here a positive input) can be coupled to a node 413 (e.g., a positive node of the compensator output 110 with reference to ground) and be configured to charge the first capacitor 411a to substantially the same voltage provided at the node 413 (e.g., the compensator output voltage $V_{ea\_comp}$).

Continuing with the above example, when control signal q(t) has a second value different from the first value (e.g., control signal q(t) is high or a logical 1), the first switch 431a is open (or biased or otherwise set into its open or off state) and the second switch 431b is closed (or biased or otherwise set into its closed or on state) such that the first capacitor 411a is electrically disconnected from the buffer 412 and is coupled in parallel with capacitor 411b such that the compensator has an effective capacitance value of $C_{gm}=C_{gm1}+C_{gm2}$.

As noted above, the complementary switches 431a, 431b are configured to transition between a first state and a second state. When the complementary switches 431a, 431b are in the first state, the first capacitor $C_{gm1}$ 411a can be charged by buffer 412 to the voltage provided at the node 413 (e.g., the compensator output voltage $V_{ea\_comp}$) without capacitor $C_{gm1}$ 411a affecting how the compensator behaves. When the complementary switches 431a, 431b are in the second state, the first capacitor $C_{gm1}$ 411a and the second capacitor $C_{gm2}$ 411b are coupled in parallel to the node, operating together as a single capacitor.

In embodiments, when the switch control signal q(t) changes from a first value to a second different value (e.g., from a logical 0 to a logical 1), the effective compensator capacitor $C_{gm}$ 411 changes to $C_{gm1}+C_{gm2}$ from $C_{gm1}$. However, because capacitor $C_{gm2}$ 411b may be appropriately precharged by the buffer 412, the compensator output voltage $V_{ea\_comp}$ is not disturbed (e.g., no transient impact is caused on the voltage across $C_{gm1}$ 411a and/or $C_{gm2}$ 411b). Likewise, when switch control signal q(t) changes from the second, different value to the first value (e.g., from a logical 1 to a logical 0), the effective compensator capacitor 411 changes to $C_{gm1}$ from $C_{gm1}+C_{gm2}$ without disturbing the compensator output. Thus, depending on the state of the complementary switch pair and the total effective compensator capacitance provided by capacitor 411 determined by switch control signal q(t), different pole locations for the compensator may be provided. In this way, the total effective compensator capacitance provided by capacitor 411 can cause one or more dynamics of the compensator 400 to be adjusted.

It will be appreciated that with additional capacitors and complementary switch pairs (with corresponding control signals) the range of programmability of a compensation capacitor may be increased.

Figure 5:
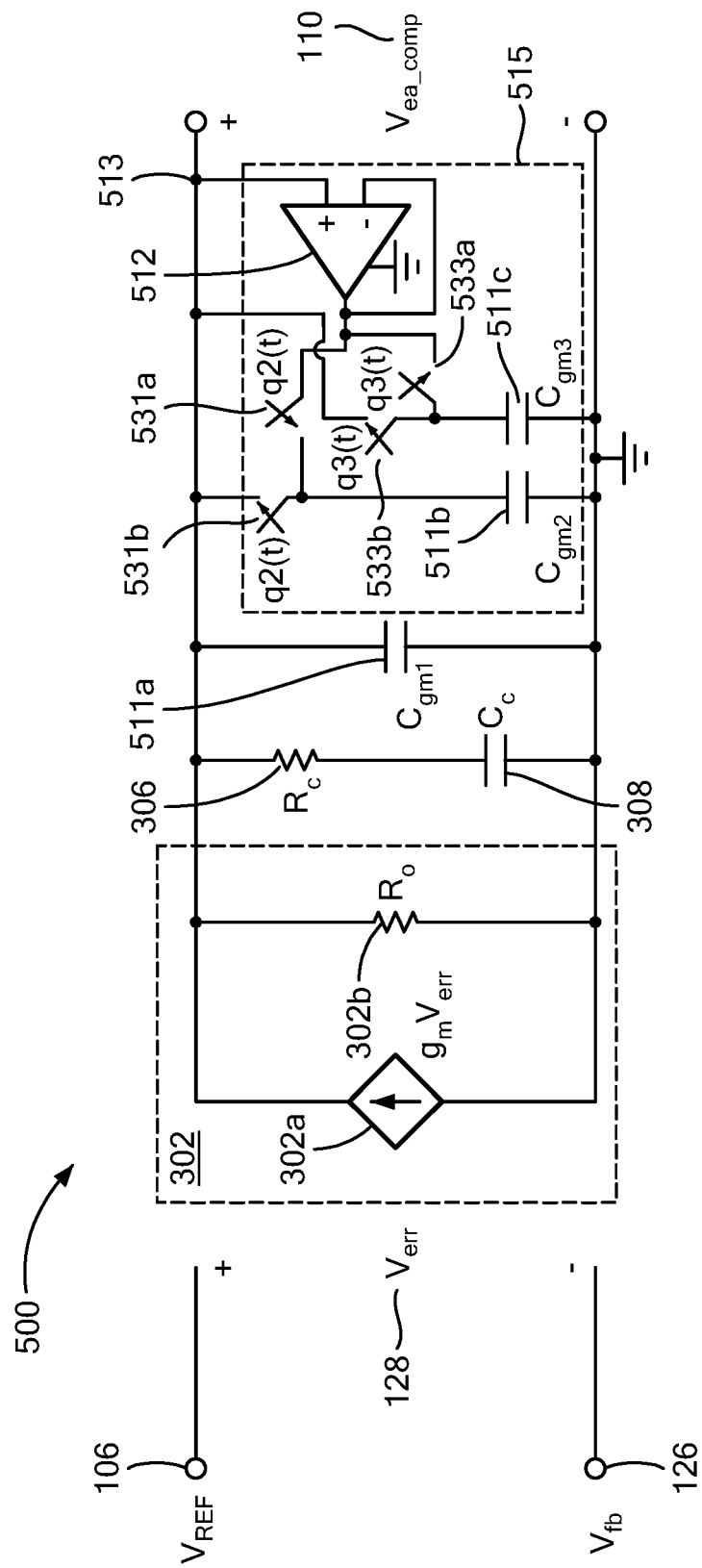
FIG. 5 is a schematic diagram of an exemplary compensator having a capacitor $C_{gm}$ which can be dynamically changed among a plurality of capacitance values without disturbing a signal provided at an output of the compensator.

FIG. 5, for example, shows a circuit diagram of an exemplary compensator 500 comprising a plurality of compensation capacitors. In this example embodiment, compensator 500 comprises three (3) compensation capacitors. After reading the disclosure provided herein, those or ordinary skill in the art will appreciate that compensator 500 may comprise fewer or more than three compensation capacitors. In this example, compensator 500 comprises a first compensation capacitor 511a having a capacitance value of $C_{gm1}$, a second compensation capacitor 511b having a capacitance value of $C_{gm2}$, and a third compensation capacitor 511c having a capacitance value of $C_{gm3}$.

With the plurality of compensation capacitors in the example embodiment of FIG. 5, the effective capacitance value of compensator 500 can be dynamically reprogrammed (i.e. adjusted or changed) among 4 values: $C_{gm1}$, ($C_{gm1}+C_{gm2}$), ($C_{gm1}+C_{gm3}$), and ($C_{gm1}+C_{gm2}+C_{gm3}$) without disturbing (i.e., without disrupting or otherwise substantially changing) the voltage $V_{ea\_comp}$ at the compensator output 110.

In this example embodiment, programming (or adjustment or changing) of the compensator capacitance is done via two control signals $q_2(t)$ and $q_3(t)$ (i.e., switch control signals) that control a switching network that can include complementary switch pairs 531a, b (generally denoted 531), 533a, b (generally denoted 533). Each of the control signals $q_2(t)$ and $q_3(t)$ controls one of the complementary switch pairs 531, 533, and the control signals $q_2(t)$ and $q_3(t)$ cause corresponding capacitors 511b and 511c to be switched between participating in the compensation and being precharged by a buffer 512. The complementary switch pairs 531, 533, the buffer 512, and the capacitors $C_{gm2}$-$C_{gm3}$ 511b-c are part of a capacitive buffer circuit 515 of the compensator 500. In this example, control signal $q_2(t)$ controls complementary switch pair 531a, 531b and control signal $q_3(t)$ controls complementary switch pair 533a, 533b.

The first complementary switch pair 531a, 531b is coupled to the capacitor $C_{gm2}$ 511b and second complementary switch pair 533a, 533b is coupled to the capacitor $C_{gm3}$ 511c (sometimes referred to herein as a third capacitor, e.g., relative to the first and second capacitors of FIG. 4). The first complementary switch pair 531a, 531b and the capacitor 511b are configured to operate similarly to the first capacitor 411a and the complementary switch pair 431 of FIG. 4.

The second complementary switch pair 533 is configured to transition between a first state and a second state. When the second complementary switch pair 533 is in the first state, a first switch 533a is closed (i.e., switch 533a is in its ON state) and a second switch 533b is open (i.e., switch 533b is in its OFF state) such that the third capacitor 511c can be charged to a voltage provided at a node 513 to which a positive input of the buffer 512 is coupled. In the first state, the third capacitor $C_{gm3}$ 511c can be coupled to an output of the buffer 512 to charge to the voltage $V_{ea\_comp}$ provided at the compensator output 110. The compensator output voltage $V_{ea\_comp}$ is provided at the node 513 relative to ground. When the second complementary switch pair 533 is in the second state, the first switch 533a is open and the second switch 533b is closed such that the third capacitor $C_{gm3}$ 511c can be coupled to the node 513 in parallel with $C_{gm2}$ 511b and/or $C_{gm1}$ 511a (e.g., which can correspond to the first and second capacitors of FIG. 4).

Generally, augmenting a base capacitor (e.g., capacitor 511a) with N complementary switch pairs and associated programming capacitors will allow selection among up to $2^N$ programmable values of compensation capacitance.

It will be further appreciated that compensator designs can be implemented having multiple programmable compensation capacitors.

Figure 6A:
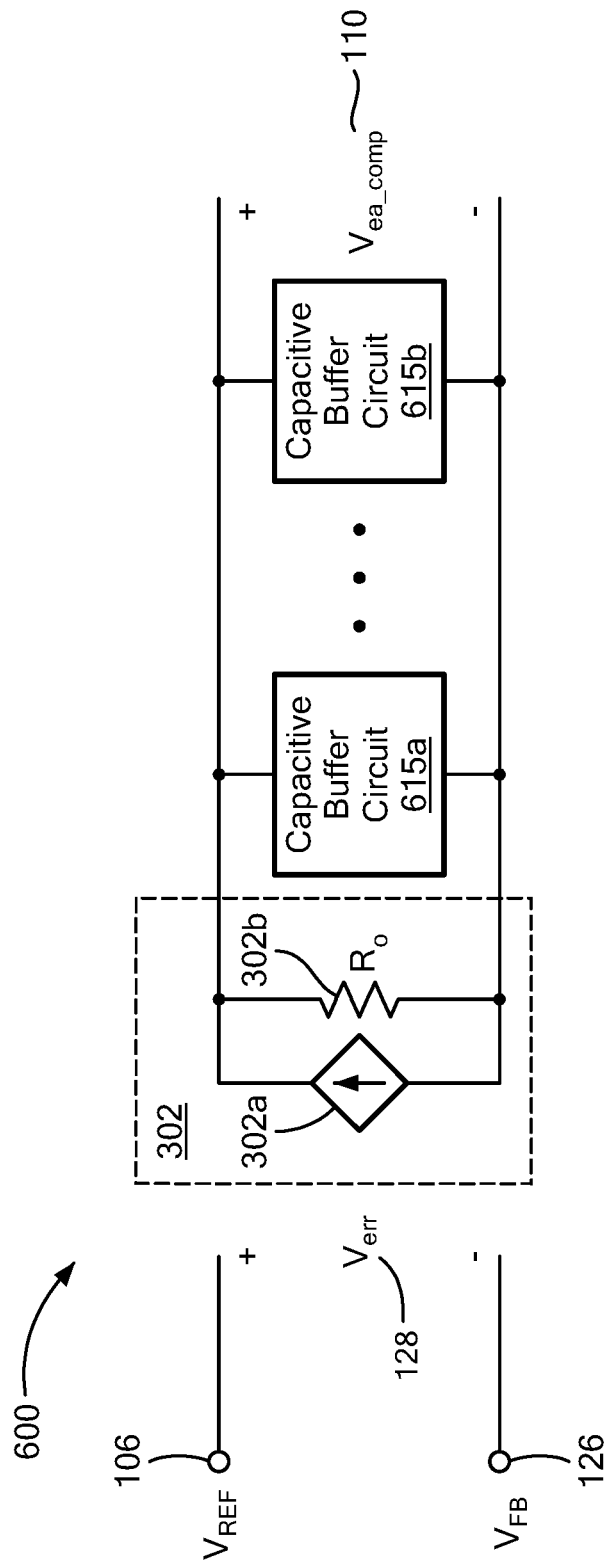
FIG. 6A is a schematic diagram of an exemplary compensator that includes a plurality of capacitive buffer circuits.

Referring now to FIG. 6A in which like elements of FIG. 4 are provided having like reference designations, shown is a circuit diagram of an exemplary compensator 600 that may be generally similar to the compensators described in the preceding figures. The circuit diagram expresses the concept that the compensators described herein may include one or more capacitive buffer circuits 615a, 615b, . . . 615n. Each of the capacitive buffer circuits 615 can include at least one or more capacitors, one or more resistors, one or more buffers, and a switching network that can include one or more switches that are configured to couple the elements in a way that causes one or more of the dynamics of the circuit to be adjusted without causing a transient impact on the output voltage $V_{ea\_comp}$ at the compensator output 110.

Figure 6B:
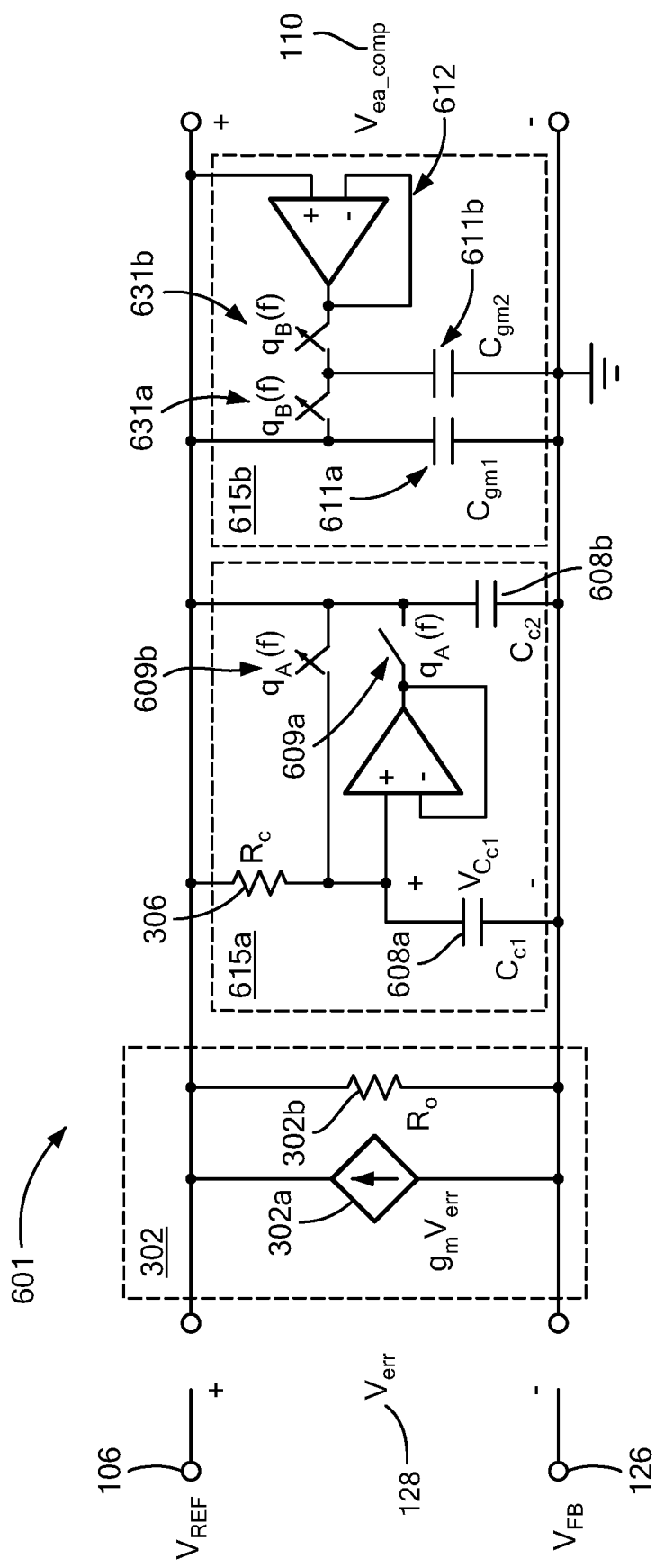
FIG. 6B is a schematic diagram of an exemplary compensator in which the values of capacitive buffer circuits can each be dynamically changed (or reprogrammed) among two (2) values.

Referring now to FIG. 6B in which like elements of FIG. 6A are provided having like reference designations, a circuit diagram of an exemplary compensator 601 in which the values of compensator capacitors $C_{gm}$ 611 and $C_c$ 608 are each dynamically reprogrammable among two values. Compensator 601 comprises first and second capacitive buffer circuits 615a, 615b. The right-half of the circuit diagram comprises second capacitive buffer circuit 615b which may be the same as or similar to capacitive buffer circuit 615b shown in FIG. 6A). Capacitive buffer circuit 615b may operate in a manner which is the same as or similar to the capacitive buffer circuit described above in conjunction with FIG. 4, with a buffer 612 configured to charge a capacitor 611b and a switching network including a complementary switch pair 631 configured to switch between two states to cause the capacitor 611b to switch between being charged by the buffer 612 and being coupled to another capacitor 611a in parallel.

The left-half of the circuit diagram, corresponding to capacitive buffer circuit 615a, which may be the same as or similar to capacitive buffer circuit 615b shown in FIG. 6A, employs a concept similar to the ones described with respect to the preceding figures. In particular, the compensator 600 includes a first capacitor $C_{c1}$ 608a that is coupled to a positive input of a buffer 607, a second capacitor $C_{c2}$ 608b coupled to an output of the buffer 607, and a complementary switch pair 609 configured to alternate between a first state and a second state. In the first state, a first switch 609a is closed and a second switch 609b is opened such that the second capacitor $C_{c2}$ 608b charges to a voltage equal to a voltage across the first capacitor $C_{c2}$ 608a. In the second state, the first switch 609a is open and the second switch 609b is closed such that the second capacitor $C_{c2}$ 608b is coupled in parallel with the first capacitor $C_{c1}$ 608a. When coupled in parallel, the combined capacitance of the first capacitor $C_{c1}$ 608a and the second capacitor $C_{c2}$ 608b is coupled in series with the resistor $R_c$ 406.

A control signal $q_A$ can be used for programming the capacitance used for capacitors $C_{c1}$ 608a and $C_{c2}$ 608b, and a control signal $q_B$ can be used for programming the capacitance used for capacitors $C_{gm1}$ 611a and $C_{gm2}$ 611b. One could likewise have circuits in which each programmable in multiple steps as illustrated in the preceding figures.

The capacitor value(s) used in the compensator can be automatically adjusted based on operating mode (e.g., buck vs. boost, etc.), operating point (e.g., input voltage, output voltage, conversion ratio, load current value, etc.) or other range associated with converter operation, or based on associated reference or target values. Alternatively or additionally, the values may be made software or firmware programmable, e.g. using registers that control the control signals q(t).

While the above examples focus on various types of compensators and implementations that are easily realized for IC power converter designs, it will be appreciated that a variety of compensator types and implementations can benefit from the programmability described herein. For example, one can realize a variety of compensator types with programmable capacitor values (e.g., integral, lead, lag, lead-lag, PI, PID, PD, type I, type II, type III, etc.) Moreover, other circuit implementations for compensators can be used, such as compensator designs using an op amp as an error amplifier.

Figure 7:
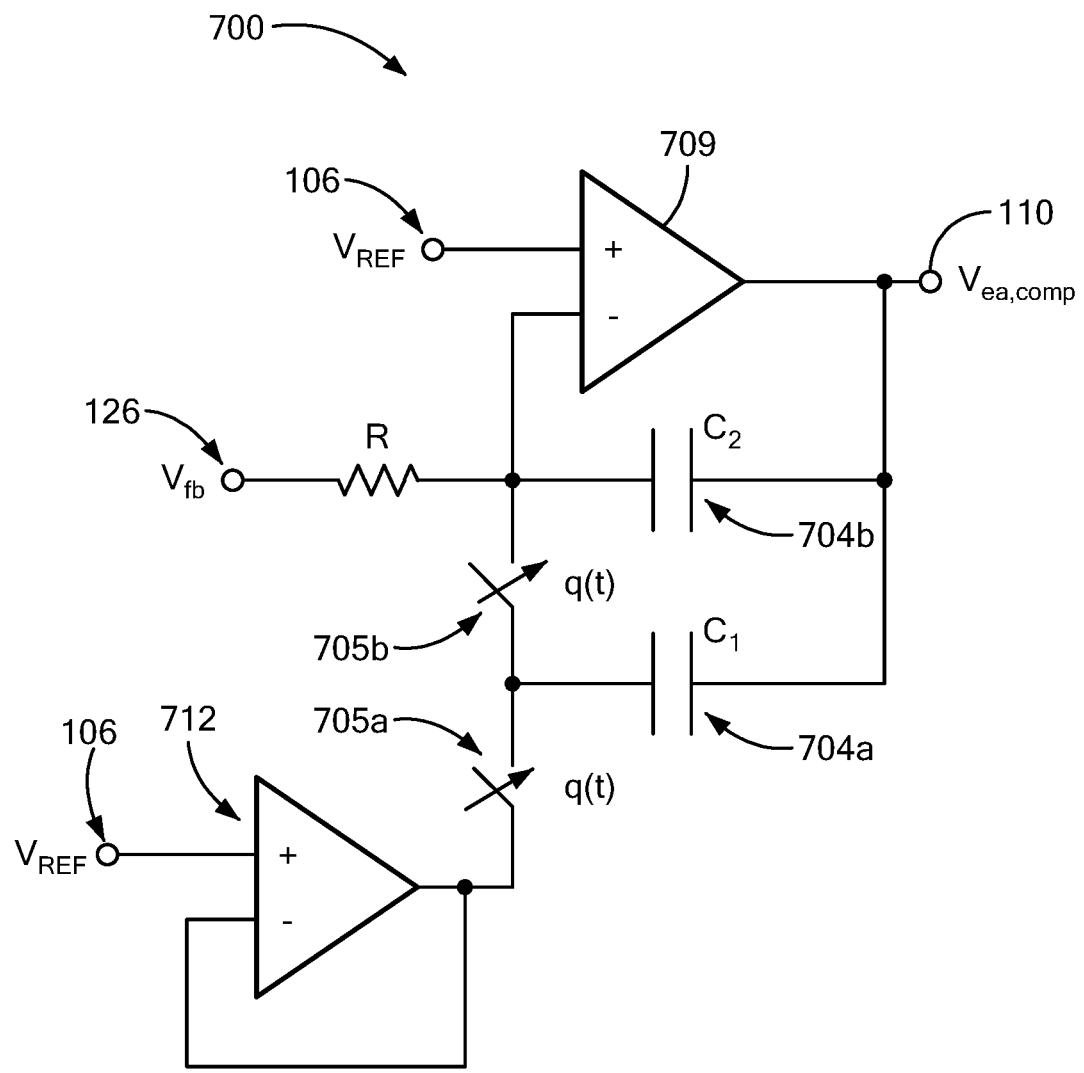
FIG. 7 is a schematic diagram of an exemplary compensator in which a capacitive value of a feedback capacitor C can be dynamically reprogrammed among two (2) values.

FIG. 7 shows a circuit diagram of an exemplary compensator 700 based on an op-amp 709 in which a net feedback capacitance C is provided by various combinations of capacitors 704a 704b (generally denoted 704). The net capacitance value C can be dynamically selected to correspond to one of two values ($C_1$ and $C_1+C_2$) via control signal q(t). The compensator 700 includes a switching network that can include a complementary switch pair 705a, 705b configured to switch between a first state and a second state. In the first state, first switch 705a is closed and second switch 705b is open such that capacitor $C_2$ 704b is charged to a reference voltage $V_{REF}$ 706 by a buffer 712. In this way, capacitor $C_1$ 704a is pre-charged to the voltage it would have in the compensator 700 when it participates in the compensator 700 (e.g., when it is switched into the compensator 700 in such a way that it can have an influence on dynamics of the compensator 700). This voltage can have the same value as the "active" capacitor it will be placed in parallel with (e.g., capacitor $C_2$ 704b). In some implementations, the capacitor $C_1$ 704a is pre-charged to a voltage related to the output voltage $V_{ea\_comp}$ 110 and the feedback voltage $V_{fb}$ 126. In the second state, first switch 705a is open and second switch 705b is closed such that capacitor $C_1$ 704a is coupled in parallel with capacitor $C_2$ 704b. In this way, the dynamics of the compensator 700 can be adjusted without causing a transient impact on the compensator output voltage $V_{ea\_comp}$ 110.

It will be appreciated that while this is a type I or integral controller, other controller types (including, but no limited to on/off controllers, proportional controllers derivative controllers) with one or more programmable circuit elements (including, but not limited to one or more programmable capacitors and/or one or more programmable resistors) may be realized by adding or modifying the passive component networks around the op-amp 809 accordingly.

Moreover, it is also possible to use the proposed technique to adjust other compensator aspects. For example, by appropriately switching capacitor values and/or resistor values or gains, one can dynamically adjust the slope associated with slope compensation in a current-mode control circuit. This can be done as described for varying operating points, varying modes (e.g., buck vs. boost), or even within a switching cycle when transitioning from one mode or sub-mode to another (e.g., in moving from buck to extended buck+buck-boost mode). Such a multi-slope compensating ramp could be valuable in improving not only low-frequency dynamics over multiple modes and wide operating ranges but also ripple dynamics (i.e., as associated with "ripple instability" in current-mode-controlled converters.) One can likewise dynamically adjust PWM ramp slope in this manner, either on a long-term basis or within a switching cycle. These functions may be accomplished because the associated waveforms are generated by charging a capacitor via a current source or resistor, and the capacitor and/or resistor and/or current source can be dynamically reprogrammed as described herein.

Although reference is sometimes made herein to use of the described compensators with power electronics and/or as part of a controller, it should be appreciated that compensators provided in accordance with the concepts described herein may find use in a wide variety of applications including any applications which operate with a control system. It is also recognized that compensators may be designed using electrical, mechanical, pneumatic or any other components. It should thus be appreciated that elements (including circuit elements) other than those specifically disclosed herein may be substituted where appropriate to suit the needs of a particular application, and that a person having ordinary skill in the art would understand how to select such elements and incorporate them into embodiments operating in accordance with the concepts described herein without deviating from the scope of the concepts described herein.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections are set forth between elements in the above description and in the drawings. These connections, unless specified otherwise, can be direct or indirect, and the described concepts, systems, devices, structures and techniques are not intended to be limiting in this respect. Accordingly, reference to coupled elements or a coupling of elements can refer to either a direct or an indirect coupling.

As an example of an indirect relationship, references in the present description to coupling element "A" to element "B" include situations in which one or more intermediate elements (e.g., element "C") is between element "A" and element "B" as long as the relevant characteristics and functionalities of element "A" and element "B" are not substantially changed by the intermediate element(s).The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration." Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A circuit comprising:
a first capacitor configured to be charged to a voltage representing state information of a compensator;
a second capacitor;
a buffer; and
a switching network configured to transition between a first state and a second state, wherein when the switching network is in the first state, the second capacitor is connected to the output of the buffer and charged to the voltage across the first capacitor, and wherein when the switching network is in the second state, the buffer is disconnected from the second capacitor and the first capacitor and the second capacitor are connected in parallel.

2. The circuit of claim 1, wherein when the switching network is in the first state, dynamics of the compensator are determined at least in part by the first capacitor, and when the switching network is in the second state, the dynamics of the compensator are determined at least in part by a total capacitance provided by the first capacitor and the second capacitor connected in parallel.

3. The circuit of claim 2, wherein switching between the first state and the second state of the switching network affects a capacitance of the circuit, which affects a pole location of the compensator.

4. The circuit of claim 2, wherein switching between the first state and the second state of the switching network affects a capacitance of the circuit, which affects a zero location of the compensator.

5. The circuit of claim 1, wherein transitioning the switching network between the first and second states does not cause a transient impact on the voltage across the first capacitor.

6. The circuit of claim 1, wherein transitioning the switching network between the first and second states does not cause a transient impact on a voltage provided at an output of the compensator.

7. The circuit of claim 6, wherein transitioning the switching network between the first and second states does not disturb the voltage provided at the output of the compensator.

8. The circuit of claim 1, wherein the switching network comprises a complementary switch pair configured to switch between the first state and the second state.

9. The circuit of claim 8, wherein when the complementary switch pair is in the first state, a first switch is closed and a second switch is open, and when the complementary switch pair is in the second state, the first switch is open and the second switch is closed.

10. The circuit of claim 1, further comprising:
a third capacitor, wherein the buffer is configured to charge the third capacitor to a voltage substantially equal to the voltage across the first capacitor, and
wherein the switching network is configured to transition between at least two additional states to cause the third capacitor to switch between being charged to the voltage across the first capacitor, and being disconnected from the buffer and connected in parallel with one or both of the first capacitor and the second capacitor.

11. The circuit of claim 1, further comprising a resistor connected to one or both of the first capacitor and the second capacitor.

12. The circuit of claim 1, wherein the circuit is part of a power converter.

13. The circuit of claim 1, wherein the switching network is controlled by a control signal.

14. The circuit of claim 13, wherein the compensator is part of a system having a power converter, wherein the control signal automatically causes switches of the switching network to switch based on one or both of an operating mode and an operating point of the power converter.

15. The circuit of claim 13, wherein the control signal automatically causes switches of the switching network to switch based on an operating mode of a power converter, wherein the operating mode comprises at least one of a buck, boost, or buck+buck–boost mode.

16. The circuit of claim 13, wherein the control signal automatically causes switches of the switching network to switch based on an operating point of a power converter, wherein the operating point comprises one or more of an input voltage, an output voltage, a conversion ratio, or a load current of the power converter.

17. The circuit of claim 1, wherein the buffer comprises an op-amp.

18. The circuit of claim 17, wherein the op-amp is configured to charge the second capacitor to a voltage that is related to an output voltage and a reference voltage of the compensator.

19. A compensator circuit configured to provide an output voltage, the compensator circuit comprising:
    a first capacitor configured to be charged to a voltage representing state information of the compensator circuit;
    a second capacitor;
    a buffer; and
    a first switching network configured to transition between a first state and a second state, wherein when the first switching network is in the first state, the second capacitor is connected to the output of the buffer and charged to the voltage across the first capacitor, and wherein when the first switching network is in the second state, the buffer circuit is disconnected from the second capacitor and the first capacitor and the second capacitor are connected in parallel;
    a plurality of resistors;
    a second switching network coupled to at least one of the plurality of resistors, wherein the second switching network is configured to transition between states to cause selected ones of the plurality of resistors to be connected in parallel with each other; and
    a third capacitor coupled to the selected ones of the plurality of resistors connected in parallel with each other.

20. The compensator circuit of claim 19, wherein dynamics of the compensator circuit are determined at least in part by a total resistance provided by the selected ones of the plurality of resistors connected in parallel with each other.

21. The compensator circuit of claim 20, wherein the total resistance affects a zero location of the compensator circuit.

22. The compensator circuit of claim 19, wherein the compensator circuit is part of a power converter.

* * * * *